United States Patent [19]

Kurahashi

[11] Patent Number: 4,504,520
[45] Date of Patent: Mar. 12, 1985

[54] PROCESS AND APPARATUS FOR PRODUCING WOOD HEADS OF GOLF CLUBS

[75] Inventor: Koichiro Kurahashi, Nishinomiya, Japan

[73] Assignee: Sumitomo Rubber Industries, Inc., Kobe, Japan

[21] Appl. No.: 617,402

[22] Filed: Jun. 5, 1984

[30] Foreign Application Priority Data

Jun. 7, 1983 [JP] Japan .................................. 58-102345
Jun. 8, 1983 [JP] Japan .................................. 58-103323
Jun. 8, 1983 [JP] Japan .................................. 58-103324

[51] Int. Cl.³ ............................................. B05D 3/06
[52] U.S. Cl. .......................................... 427/44; 118/50; 118/428; 118/429; 273/167 R; 427/297; 427/325; 427/440
[58] Field of Search .................. 427/36, 44, 325, 440, 427/297; 273/167 R, 167 F, 169; 118/428, 429, 50

[56] References Cited

U.S. PATENT DOCUMENTS

| | | | |
|---|---|---|---|
| 2,591,768 | 4/1952 | Austin | 273/167 F |
| 2,936,248 | 5/1960 | Marciniak | 427/325 |
| 4,071,637 | 1/1978 | Dittrich et al. | 427/440 |
| 4,076,254 | 2/1978 | Nygren | 273/167 R |

Primary Examiner—John H. Newsome
Attorney, Agent, or Firm—Armstrong, Nikaido, Marmelstein & Kubovcik

[57] ABSTRACT

A process for producing the wood head of a golf club by impregnating a wood head workpiece with a resin to give durability to the wood head, the process comprising the steps of forming the workpiece so that the hitting surface thereof extends in parallel with internal channels therein, subsequently immersing the workpiece in a first liquid resin composition only at the hitting side to impregnate the hitting side with the composition at a high ratio and form a resin-impregnated layer of high impregnation ratio, thereafter impregnating the entire workpiece with a second liquid resin composition at a low ratio, and polymerizing and curing the compositions. Also disclosed is an apparatus for performing the resin impregnation steps.

13 Claims, 8 Drawing Figures

PROCESS AND APPARATUS FOR PRODUCING WOOD HEADS OF GOLF CLUBS

TECHNICAL FIELD

The present invention relates to a process and an apparatus for reinforcing the wood heads of golf clubs by impregnating the heads with a resin.

BACKGROUND ART

The wood heads of golf clubs are prepared by machining persimmon or like wood into the specified shape and attaching a face insert to the hitting surface.

The face insert itself is made of a reinforced composite material or the like and has high durability against impact, so that no problem arises insofar as the face insert portion strikes the ball at all times. However, if repeated shots are made with the ball, especially the two-piece ball recently widely used, in contact with the clubhead except at the face insert area, the clubface becomes dented by the impact. FIG. 6 shows a dent 83 formed at a location slightly away from a face insert 81 toward the toe 82 and resulting from repetitions of impact.

To overcome the above problem, it has been practice to impregnate the wood head with a liquid resin composition comprising thermally polymerizable plastic monomers, oligomers, a mixture of such compounds or one or at least two of unsaturated polyesters and to thereafter polymerize and cure the composition by heating or by irradiation with gamma rays or the like to give the wood head improved impact resistance and durability.

In order to assure improved impact resistance and durability, it is also known to impregnate a wood head with such a resin composition, fit the impregnated head into a mold having a similar shape to the head and polymerize the composition by heating with application of pressure to obtain a compressed head.

However, these methods have the following problems.

(i) To obtain sufficient impact resistance, it is invariably necessary to impregante the wood head with an increased amount of resin composition, which renders the head heavier. It is therefore impossible to obtain a wood head having an allowable weight of up to 190 g (exclusive of the face insert and metal sole).

(ii) The heat generated by the polymerization of the resin composition produces a very high temperature in the central portion of the head to crack or deteriorate the inner portion of the head. The higher the resin impregnation ratio, the more pronounced is this phenomenon.

(iii) The wood head impregnated with the resin composition at a high ratio requires a prolonged period of time for the polymerization to completely proceed up to the central portion. The higher the impregnation ratio, the longer is the time taken.

(iv) In the case of compressed heads, the compression process breaks down wood fibers, reducing the inherent strength of wood, with the result that the junction between the head and the shaft, i.e. the neck, is liable to fracture or crack when striking golf balls.

SUMMARY OF THE INVENTION

An object of the present invention is to provide a process for producing wood heads for golf clubs which imparts high impact resistance to the hitting surface and gives outstanding water resistance, dimensional stability and amenability to coating to the wood head in its entirety.

Another object of the invention is to provide a process for producing wood heads for gold clubs which has been developed with attention given to the structure of the wood head that internal channels are so machined and shaped as to extend in parallel with the neck and with the hitting surface, the process comprising the steps of impregnating the hitting side of a head workpiece with a liquid resin composition at a high ratio to a suitable thickness, further impregnating the entire workpiece with a liquid resin composition at a low ratio and thereafter polymerizing the resin compositions by heating or by irradiation with ionizing radiation.

Another object of the invention is to provide an apparatus for impregnating head workpieces with the resin compositions efficiently and accurately which comprises a closed case connected to a vacuum pump, at least one receptacle disposed within the case, a resin composition supply pipe disposed above the receptacle and a liquid level adjusting tube attached to the bottom of the receptacle and positioned at an adjustable level.

DETAILED DESCRIPTION OF THE INVENTION

The present invention will be described below in detail with reference to the drawings.

Figure 1:
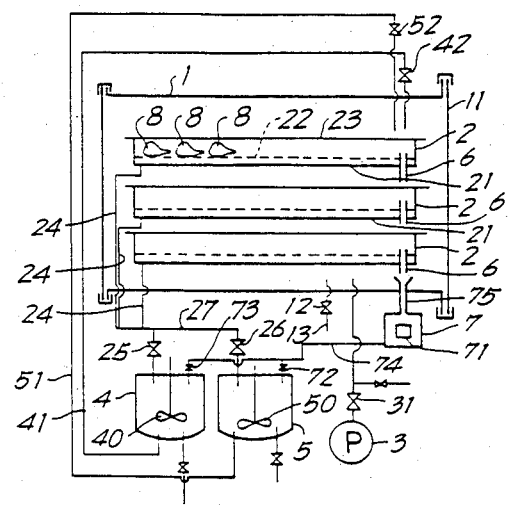
FIG. 1 is a diagram showing an apparatus of the present invention.
Figure 2:
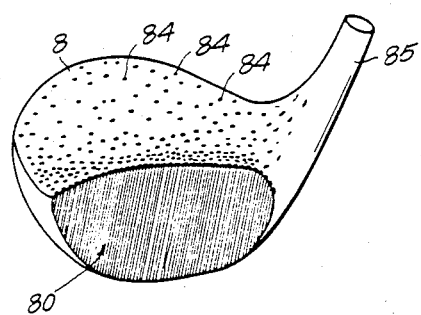
FIG. 2 is a perspective view showing a wood head workpiece which is to be impregnated with resin compositions.
Figure 3:
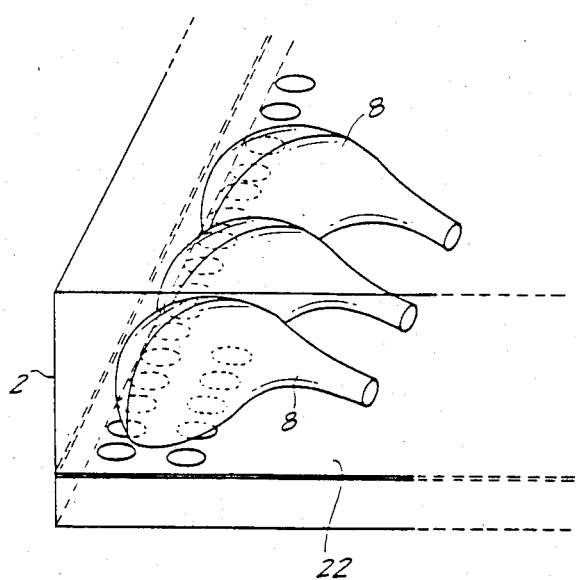
FIG. 3 is a perspective view showing wood head workpieces arranged in a receptacle.

FIG. 1 shows a resin impregnation apparatus comprising a closed case 1 provided with a closure 11 and connected to a vacuum pump 3. An air opening 13 having a valve 12 is formed in a suitable portion of the wall of the case 1.

Receptacles 2 for placing therein wood head workpieces 8 as arranged side by side are disposed within the case 1 in layers. Each of the receptacles 2 is connected to screw-type adjusting means (not shown), by which the receptacle is supported as horizontally as possible. A perforated plate 22 is horizontally disposed within the receptacle 2 at a small distance from the bottom 21 of the receptacle 2. The opening side of the receptacle 2 is covered with a metal plate 23 for preventing the workpieces 8 from rising.

First and second resin tanks 4, 5 equipped with stirrers 40, 50, respectively, are arranged in the vicinity of the case 1. Resin composition supply pipes 41, 51 connected to the tanks 4, 5 and provided with valves 42, 45, respectively, hermetically extend through the top wall of the case 1 and have their open ends positioned above the uppermost receptacle 2.

A discharge pipe 24 connected to each receptacle 2 is in communication with the first and second tanks 4, 5 through a return pipe 27 which is provided with valves 25, 26.

Each receptacle 2 has a liquid level adjusting tube 6 which extends through the bottom 21 of the receptacle liquid-tightly and vertically movably. The adjusting tube 6 is coupled to level adjusting means of the screw adjusting type (not shwn). The adjusting tube 6 of the lowermost receptacle 2 communicates with an auxiliary tank 7 through a discharge pipe 75 extending through the bottom wall of the case 1.

The auxiliary tank 7 has a transparent inspection window 71 and communicates with the first and second tanks 4, 5 through a return pipe 74 having valves 72, 73.

With use of the above apparatus, wood head workpieces are impregnated with resin compositions by the following process which comprises first to third steps. Each of wood head workpieces 8 is machined and shaped so that internal channels 84 extend in parallel with the neck and with the hitting surface.

FIRST STEP

A liquid resin composition (hereinafter referred to as "first resin composition") for impregnating the hitting side of the head workpiece is contained in the first tank 4. The second tank 5 contains another liquid resin composition (hereinafter referred to as "second resin composition") for impregnating the head workpiece in its entirety.

The upper end of each adjusting tube 6 is positioned 4 to 18 mm above the perforated plate 22.

Head workpieces 8 are arranged on the perforated plate 22 with the hitting side down, and the metal plate 23 is placed over the workpieces 8.

The vacuum pump 3 is operated to evacuate the interior of the case 1, preferably to a vacuum of up to 50 torr.

The workpieces 8 are then allowed to stand for a specified period of time, and the valve 42 is then opened to introduce the first resin composition into the uppermost receptacle 2.

Figure 4:
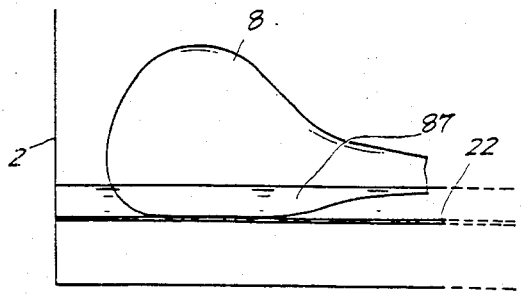
FIG. 4 is a diagram showing the step of impregnating the hitting side of the wood head workpiece with the resin composition.
Figure 6:
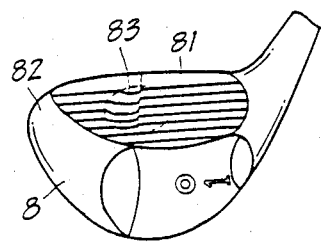
FIG. 6 is a perspective view showing a wood head with a dent.
Figure 5:
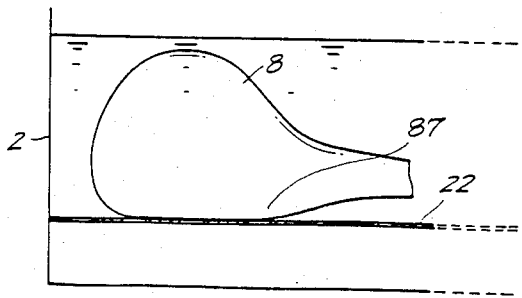
FIG. 5 is a diagram showing the step of impregnating the entire workpiece with the resin composition.

When the composition admitted exceeds the liquid level set by the adjusting tube 6, the composition overflows the tube 6 into the next lower receptacle. In this way, the resin composition fills the receptacles 2 to the set level from stage to stage downward as seen in FIG. 4. The resin composition overflowing the adjusting tube 6 of the lowermost receptacle 2 is received by the auxiliary tank 7.

When the composition starts to flow into the auxiliary tank 7, the valve 42 is closed to discontinue the supply of the resin composition.

Next, a valve 31 for the vacuum pump 3 is closed, and the valve 12 for the air opening 13 is opened to return the interior of the case 1 to atmospheric pressure.

The apparatus is then allowed to stand for a predetermined period of time, and the valves 25, 73 are thereafter opened to return the resin composition from the receptacles 2 and the auxiliary tank 7 to the first tank 4.

The first step has now been completed, whereby the portion of each head workpiece 8 immersed in the resin composition on the hitting side thereof is impregnated with the resin composition to form a resin-impregnated layer 87 of high impregnation ratio.

SECOND STEP

The open valves of the apparatus are closed, and the closure 11 of the case 1 is opened. The adjusting tubes 6 are adjusted to a level slightly higher than the height of the head workpieces 8. The closure 11 is closed after placing the metal plates 23 over the workpieces 8.

The valve 52 on the resin supply pipe 51 from the second tank 5 is opened, and the valve 12 for the air opening 13 of the case 1 is closed. The vacuum pump 3 is operated with its valve 31 opened.

The interior of the case 1 is evacuated, and each receptacle 2 is filled with the second resin composition to the level of the upper end of the adjusting tube 6. When the composition starts to flow into the auxiliary tank 7, the valve 52 on the supply pipe 51 is closed to discontinue the supply of the resin composition. The valve 31 of the vacuum pump 3 is opened, and the valve 12 for the air opening 13 is opened to return the interior of the case 1 to atmospheric pressure.

After allowing the apparatus to stand in this state for a predetermined period of time, the valves 26, 72 are opened to recover the resin composition in the second tank 5.

The second step has now been completed, whereby each head workpiece 8, which has been impregnated with the first resin composition at a high ratio on its hitting side by the first step, is further impregnated in its entirety with the second resin composition at a low ratio.

THIRD STEP

The resin compositions impregnating the workpieces are polymerized and cured by the third step.

The wood head workpieces 8 are withdrawn from the case 1 and then heated in an oven (not shown) or irradiated with ionizing radiation such as alpha rays, beta rays, gamma rays, neutron rays, electron rays or the like to polymerize the resin compositions for curing.

In practicing the present invention, the first resin composition preferably has the following characteristics.

Being capable of impregnating the wood head workpiece at a high ratio.

Giving a great effect to reinforce the wood material after polymerization.

Being completely polymerizable rapidly at a temperature of up to 90° C.

Being minimized in the amounts of monomers to be evaporated during heating.

Having the longest possible pot life.

Preferably the second resin composition has the following characteristics.

Having an impregnation ratio which is easily adjustable in the range of from 0.5 to 5%.

Being minimized in the amounts of monomers to be evaporated during heating.

Having a long pot life.

Being very effective for giving water resistance and dimensional stability.

To assure these characteristics to the greatest possible extent, the first and second resin compositions are prepared according to different formulations in the examples to follow, but the same resin composition is usable for practicing the present invention.

It is desired that the components of the first and second resin composition include polyethylene glycol dimethacrylate represented by the formula

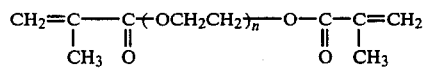

wherein n is 1 to 23, or polyethylene glycol diacrylate represented by the formula

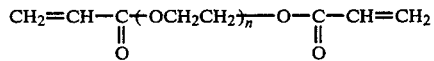

wherein n is 1 to 23.

Examples are given below wherein persimmon head workpieces were used without any face insert or sole plate.

EXAMPLE 1

| | Parts by weight |
|---|---|
| First resin composition | |
| Methyl methacrylate monomer | 30 |
| Polyethylene glycol monomethacrylate | 40 |
| Trimethylolpropane trimethacrylate | 30 |
| α,α'-Azobisisobutyronitrile | 1.0 |
| resin composition | |
| Methyl methacrylate monomer | 10 |
| Polypropylene glycol monomethacrylate | 50 |
| Trimethylolpropane trimethacrylate | 40 |
| α,α'-Azobisisobutyronitrile | 1.0 |

| Impregnation conditions | | |
|---|---|---|
| First step | Vacuum | 20 torr, 30 min. |
| | Immersion at atmospheric pressure after supply of composition (liquid level: 10 mm from hitting surface) | 45 min. |
| Second step | Immersion at atmospheric pressure | 20 min. |
| Third step | Heating | 90° C., 4 hrs. |

Wood heads were prepared by impregnating workpieces with the resin compositions under the above conditions. These wood heads and those prepared by other methods were tested for impact resistance with the results shown in Table 1.

In Comparison Example 1 listed, plain wood heads were tested without any resin impregnation treatment.

In Comparison Example 2, head workpieces were entirely impregnated with the first resin composition at a high ratio and then heated to polymerize and cure the composition.

In Comparison Example 3, head workpieces were entirely impregnated with the second resin composition at atmospheric pressure and then heated for polymerization.

The impact resistance, water absorption and Brinell hardness listed were determined by the following methods.

Impact resistance

The wood head before having a face insert fitted thereto was struck on its hitting surface by a two-piece ball at a speed of 40 m/sec, 500 times at the same portion of the surface. The resistance is expressed in terms of the depth of the resulting dent.

Water absorption

The wood head was immersed in water at 50° C.±2° C. for 24 hours at the portion thereof other than the hitting side to determine the resulting water absorption (%) given by:

$$\text{Water absorption} = \frac{W_2 - W_1}{W_1} \times 100$$

wherein $W_1$ is the weight of the head before absorbing water, and $W_2$ is the weight of the head after absorbing water. Brinell hardness The Brinell hardness of the hitting surface was measured by the method of JIS Z 2243.

TABLE 1

| | | Weight of workpiece (g) | Impregnation ratio Face portion (%) | Impregnation ratio Entirety (%) | Weight after treatment (g) | Impact resistance (μm) | Water absorption (%) | Brinell hardness (HB) |
|---|---|---|---|---|---|---|---|---|
| Example 1 | Sample (1) | 156 | 44.5 | 2.8 | 167 | 11 | 21.8 | 8.5 |
| | Sample (2) | 168 | 32.8 | 2.4 | 177 | 12 | 32.5 | 10.1 |
| | Sample (3) | 172 | 46.9 | 3.8 | 186 | 9 | 31.0 | 9.3 |
| Comparison Example 1 | Sample (1) | 152 | — | — | — | 560 | 46.9 | 4.7 |
| | Sample (2) | 164 | — | — | — | 620 | 42.9 | 5.1 |
| | Sample (3) | 175 | — | — | — | 610 | 43.8 | 5.0 |
| Comparison Example 2 | Sample (1) | 159 | — | 37.2 | 218 | 12 | 20.5 | 8.7 |
| | Sample (2) | 164 | — | 39.6 | 229 | 15 | 21.3 | 8.9 |
| | Sample (3) | 173 | — | 47.1 | 254 | 8 | 19.8 | 8.5 |
| Comparison Example 3 | Sample (1) | 154 | — | 3.5 | 159 | 253 | 22.5 | 5.2 |
| | Sample (2) | 167 | — | 3.1 | 172 | 215 | 21.3 | 5.5 |
| | Sample (3) | 174 | — | 4.2 | 181 | 360 | 21.7 | 5.1 |

Table 1 reveals that the samples of Comparison Example 1 are low in impact resistance and have a large dent.

Figure 8:
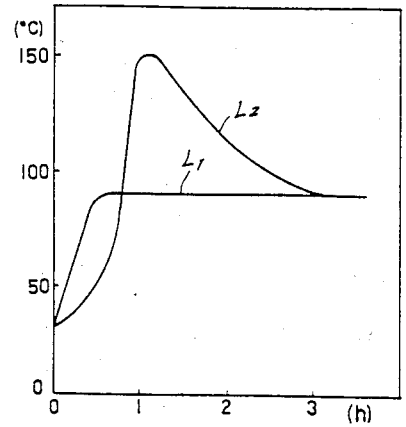
FIG. 8 is a graph showing temperature variations during polymerization by heating as determined in a comparison example.

In Comparison Example 2, the samples are remarkably reinforced but are much heavier than the allowable weight limit of 190 g and are therefore unfit for use. FIG. 8 is a graph in which Curve $L_1$ represents variations in the temperature of the wood surface during heat polymerization in Comparison Example 2, and Curve $L_2$ represents the corresponding temperature variations in the wood central portion. The graph indicates that the temperature of the wood head in its central portion rises to an abnormal level, possibly entailing cracking.

Comparison Example 3 achieves low resin impregnation ratios, failing to produce a noticeable effect.

In Example 1, the resin-treated heads weigh less than the allowable weight limit of 190 g and have sufficient impact resistance.

Furthermore, each head in its entirety is low in water absorption and is outstanding in amenability to coating and in dimensional stability.

Figure 7:
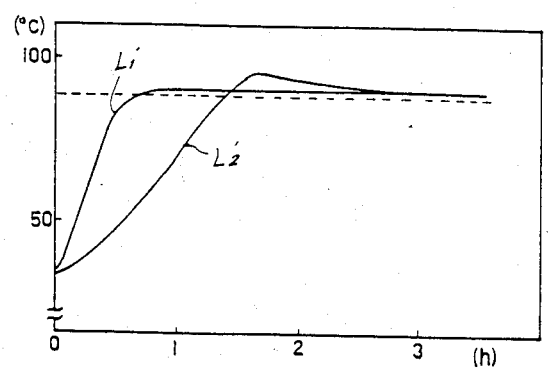
FIG. 7 is a graph showing temperature variations during polymerization by heating as determined in an example of the invention.

FIG. 7 is a graph wherein Curve $L'_1$ represents variations in the temperature of the wood surface during heat polymerization in Example 1, and Curve $L'_2$ represents the corresponding temperature variations in the wood central portion. The graph does not indicate the abnormal rise of the temperature occurring in the central portion in Comparison Example 2. Thus, there is no likelihood of the wood cracking.

EXAMPLE 2

|  | Parts by weight |
|---|---|
| First resin composition | |
| (A) NK-Ester 1G | 20 |
| (B) NK-Ester 9G | 30 |
| (C) NK-Ester 23G | 15 |
| Trimethylolpropane trimethacrylate | 35 |
| Azobisisobutyronitrile | 1.0 |
| Second resin composition | |
| (B) NK-Ester 9G | 50 |
| (C) NK-Ester 23G | 40 |
| Tetramethylolmethane tetramethacrylate | 10 |
| Azobisisobutyronitrile | 1.5 |

Of the above components, (A), (B) and (C) are brand names for compounds manufactured by Shin-Nakamura Chemical Co., Ltd., Japan and represented by the formula

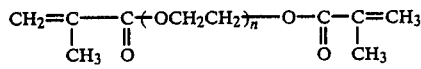

wherein n is 1 for (A), n is 9 for (B) and n is 23 for (C).

The trimethylolpropane trimethacrylate in the first resin composition is a trifunctional monomer serving as a three-dimensional crosslinking agent. The tetramethylolmethane tetramethacrylate in the second resin composition is a tetrafunctional monomer serving similarly as a three-dimensional crosslinking agent.

The azobisisobutyronitrile contained in the first and second resin compositions is a thermally decomposable radical polymerization initiator for completing polymerization in the interior of the wood head workpiece at an elevated temperature of 40° to 90° C. within 3 hours.

| -continued | | |
|---|---|---|
| Impregnation conditions | | |
|  | Immersion at atmospheric pressure | 1 hr. |
| Second step | Immersion | 35 min. |
| Third step | Heating | 90° C., 3.5 hrs. |

Wood heads were prepared by impregnating workpieces with the resin compositions under the above conditions. These wood heads and those prepared by other methods were tested by the foregoing methods with the results listed in Table 2.

In Comparison Example 4 listed, persimmon heads were used which were impregnated with no resin composition.

In Comparison Example 5, head workpieces of persimmon were entirely impregnated with the first resin composition at a high ratio, using the composition at a higher liquid level in the first step.

In Comparison Example 6, head workpieces of persimmon were entirely impregnated with the second resin composition at a low ratio by performing the second step only.

In Comparison Example 7, head workpieces of persimmon were subjected only to the second step with use of the first resin composition, whereby the workpieces were entirely impregnated with the composition at a low ratio. In Comparison Example 8, head workpieces of persimmon were subjected to the first step and the second steps under the same conditions as above except that the following resin compositions were used.

|  | Parts by weight |
|---|---|
| First resin composition | |
| Methyl methacrylate monomer | 80 |
| Polyethylene glycol monomethacrylate | 20 |
| Azobisisobutyronitrile | 1.0 |
| Second resin composition | |
| Styrene monomer | 70 |
| Polyethylene glycol monomethacrylate | 30 |
| Azobisisobutyronitrile | 1.5 |

TABLE 2

|  |  | Weight of workpiece (g) | Weight Increase | | | Impregnation ratio | | Impact resistance (μm) | Water absorption (%) | Brinell hardness (HB) |
|---|---|---|---|---|---|---|---|---|---|---|
|  |  |  | After 1st step (g) | After 2nd step (g) | After 3rd step (g) | Face portion (%) | Entirety (%) | | | |
| Example 2 | Sample (1) | 158 | 10.9 | 3.2 | 12.3 | 52.5 | 2.0 | 31 | 21.8 | 1.1 |
|  | Sample (2) | 167 | 9.0 | 6.0 | 13.8 | 48.3 | 3.6 | 3 | 32.5 | 0.3 |
|  | Sample (3) | 174 | 12.5 | 5.1 | 15.8 | 52.8 | 2.9 | - | 30.8 | 1.8 |
| Comparison Example 4 | Sample (1) | 159 | — | — | — | — | — | 565 | 46.9 | 4.5 |
|  | Sample (2) | 164 | — | — | — | — | — | 510 | 47.2 | 5.1 |
|  | Sample (3) | 173 | — | — | — | — | — | 505 | 43.8 | 5.0 |
| Comparison Example 5 | Sample (1) | 152 | 76.0 | — | 73.1 | 48.0 | 48.0 | 10 | 20.3 | 1.3 |
|  | Sample (2) | 164 | 85.1 | — | 82.2 | 49.8 | 49.8 | 3 | 25.4 | 0.0 |
|  | Sample (3) | 175 | 84.9 | — | 84.0 | 47.9 | 47.9 | 2 | 23.2 | 1.0 |
| Comparison Example 6 | Sample (1) | 155 | — | 4.2 | 3.9 | 2.5 | 2.5 | 385 | 32.0 | 3.9 |
|  | Sample (2) | 170 | — | 5.8 | 5.3 | 3.1 | 3.1 | 353 | 25.4 | 3 |
|  | Sample (3) | 181 | — | 6.9 | 6.3 | 3.5 | 3.5 | 350 | 29.2 | 5.9 |
| Comparison Example 7 | Sample (1) | 152 | — | 4.9 | 4.6 | 3.0 | 3.0 | 403 | 28.3 | 3.1 |
|  | Sample (2) | 160 | — | 6.5 | 6.1 | 3.8 | 3.8 | 400 | 29.5 | 3.8 |
|  | Sample (3) | 180 | — | 6.1 | 5.6 | 3.1 | 3.1 | 381 | 31.2 | 3.2 |
| Comparison Example 8 | Sample (1) | 155 | 11.3 | 29.5 | 8.2 | 13.0 | 11.8 | 210 | 29.2 | 3.1 |
|  | Sample (2) | 164 | 12.0 | 35.3 | 11.4 | 23.1 | 15.0 | 183 | 35.3 | 3.3 |
|  | Sample (3) | 179 | 9.8 | 33.9 | 8.3 | 21.0 | 19.0 | 158 | 39.8 | 3.5 |

| Impregnation conditions | | |
|---|---|---|
| First step | Vacuum | 30 torr, 30 min. |
|  | Liquid level of composition from hitting surface | 10 mm. |

Table 2 shows that the samples of Comparison Examples 4 are inferior to those of Example 2 in impact resistance, water resistance and Brinell hardness.

In Comparison Example 5, remarkable reinforcing effects are achieved, but great weight increases render the wood heads much heavier than the allowable weight limit, so that the heads are unfit for use.

Comparison Examples 6 and 7 achieve insufficient resin impregnation ratios, failing to produce remarkable effects.

In Comparison Example 8, high resin impregnation ratios are achieved before polymerization, but heat polymerization results in insufficient impregnation ratios due to the evaporation of resin components during the process. This renders the samples inferior to those of Example 2 in impact resistance, water resistance and Brinell hardness. The compositions used in Comparison Example 8 had a pot life of as short as about 5 days, whereas those of Example 2 had a pot life of 14 to 15 days.

In Example 2, the weight increases due to the impregnation are within an allowable range, while the samples have sufficient impact resistance. Each of the heads in its entirety is low in water absorption and has high emenability to coating and good dimensional stability.

EXAMPLE 3

| | Parts by weight |
|---|---|
| First resin composition | |
| Methyl methacrylate | 30 |
| Styrene | 40 |
| Acrylonitrile | 30 |
| Second resin composition | |
| Methyl methacrylate | 30 |
| Trimethylolpropane trimethacrylate | 70 |
| Impregnation conditions | |
| First step Vacuum | 30 torr, 40 min. |
| Liquid level of composition from hitting surface | 9 mm. |
| Immersion at atmospheric pressure | 50 min. |
| Second step Immersion | 30 min. |
| Third step $^{60}$Co gamma irradiation at a dose rate of $5 \times 10^4$ r/hr for about 34 hours in a nitrogen atmosphere at room temperature and atmospheric pressure. | |

EXAMPLE 4

The following resin composition was used as the first and second resin compositions.

| Resin composition | Parts by weight |
|---|---|
| Acrylonitrile | 30 |
| Polyethylene glycol monomethacrylate | 20 |
| Trimethylolpropane trimethacrylate | 50 |
| Impregnation conditions | |
| First step Vacuum | 50 torr, 30 min. |
| Liquid level of composition from hitting surface | 15 mm. |
| Immersion at atmospheric pressure | 45 min. |
| Second step Immersion | 50 min. |
| Third step $^{60}$Co gamma irradiation at a dose rate of $5 \times 10^4$ r/hr for about 60 hours in a nitrogen atmosphere at room temperature and atmospheric pressure | |

Wood heads were parepared by impregnating head workpieces with the resin composition(s) under the above conditions. These wood heads and those prepared by other methods were tested by the foregoing methods with the results given in Table 3.

In Comparison Example 9 listed, plain wood heads were tested which were not treated with any resin composition.

In Comparison Example 10, the same procedure as in Example 4 was repeated with the exception of raising the liquid level of the resin composition to 110 mm in the first step to entirely impregnate the workpieces at a high ratio and omitting the second step.

In Comparison Example 11, the second and third steps of Example 3 were performed without conducting the first step thereof to entirely impregnate the head workpieces with the second resin composition at a low rate.

In Comparison Example 12, the second and third steps of Example 4 were performed without conducting the first step to entirely impregnate the head workpieces with the resin composition at a low rate.

In Comparison Example 13, the same first to third steps of Example 4 were performed except that the liquid level was 25 mm from the hitting surface of the head in the first step.

TABLE 3

| | | Weight of workpiece (g) | Weight Increase After 1st step (g) | Weight Increase After 2nd step (g) | Weight Increase After 3rd step (g) | Impregnation ratio Face portion (%) | Impregnation ratio Entirety (%) | Impact resistance (μm) | Water absorption (%) | Brinell hardness (HB) |
|---|---|---|---|---|---|---|---|---|---|---|
| Example 3 | Sample (1) | 156 | 10.8 | 3.5 | 12.5 | 47.8 | 2.0 | 10 | 28.5 | 9.8 |
| | Sample (2) | 165 | 8.2 | 5.3 | 11.3 | 45.3 | 2.9 | 9 | 23.1 | 10.1 |
| | Sample (3) | 180 | 13.5 | 4.2 | 14.5 | 52.7 | 3.0 | 11 | 21.2 | 9.2 |
| Example 4 | Sample (1) | 149 | 16.3 | 2.8 | 17.1 | 41.5 | 1.1 | 8 | 22.8 | 9.3 |
| | Sample (2) | 164 | 14.0 | 2.9 | 15.9 | 38.1 | 1.1 | 12 | 20.5 | 9.5 |
| | Sample (3) | 182 | 10.8 | 1.5 | 10.8 | 39.5 | 0.6 | 11 | 28.3 | 10.0 |
| Comparison Example 9 | Sample (1) | 153 | — | — | — | — | — | 605 | 43.5 | 5.0 |
| | Sample (2) | 162 | — | — | — | — | — | 608 | 47.2 | 5.1 |
| | Sample (3) | 177 | — | — | — | — | — | 540 | 46.9 | 4.2 |
| Comparison Example 10 | Sample (1) | 146 | 76.1 | — | 70.8 | 48.5 | 48.5 | 10 | 19.8 | 8.9 |
| | Sample (2) | 162 | 64.3 | — | 59.3 | 36.6 | 36.6 | 9 | 23.2 | 8.8 |
| | Sample (3) | 180 | 62.3 | — | 59.5 | 33.1 | 33.1 | 13 | 20.8 | 9.5 |
| Comparison Example 11 | Sample (1) | 155 | — | 4.2 | 3.9 | 2.5 | 2.5 | 381 | 32.0 | 6.1 |
| | Sample (2) | 165 | — | 2.9 | 2.8 | 1.7 | 1.7 | 295 | 25.4 | 7.2 |
| | Sample (3) | 178 | — | 3.5 | 3.1 | 1.7 | 1.7 | 351 | 29.2 | 5.8 |
| Comparison Example 12 | Sample (1) | 159 | — | 3.5 | 3.0 | 1.9 | 1.9 | 353 | 28.3 | 7.1 |
| | Sample (2) | 167 | — | 2.9 | 2.3 | 1.4 | 1.4 | 383 | 29.2 | 6.3 |
| | Sample (3) | 181 | — | 5.3 | 4.2 | 2.3 | 2.3 | 400 | 35.3 | 6.5 |
| Comparison Example 13 | Sample (1) | 143 | 27.3 | 1.5 | 27.8 | 47.1 | 2.5 | 8 | 29.2 | 9.5 |
| | Sample (2) | 165 | 30.9 | 4.2 | 33.8 | 40.5 | 1.7 | 13 | 21.2 | 10.1 |

TABLE 3-continued

| | Weight of workpiece (g) | Weight Increase | | | Impregnation ratio | | Impact resistance (μm) | Water absorption (%) | Brinell hardness (HB) |
|---|---|---|---|---|---|---|---|---|---|
| | | After 1st step (g) | After 2nd step (g) | After 3rd step (g) | Face portion (%) | Entirety (%) | | | |
| Sample (3) | 178 | 33.8 | 2.7 | 32.3 | 50.1 | 1.1 | 12 | 28.3 | 9.1 |

Table 3 reveals that the samples of Comparison Example 9 are inferior to those of Examples 3 and 4 in impact resistance, water resistance and Brinell hardness.

Although achieving remarkable reinforcing effects, Comparison Example 10 results in greater weight gains, which render the wood heads heavier than 200 g and unfit for use. Further the temperature of the wood inner portion increases during the polymerization of the composition to permit cracking.

Comparison Examples 11 and 12 produce improved results in water absorption but fail to achieve sufficient results in impact resistance.

Comparison Example 13 produces remarkable reinforcing effects, but since the portion of high impregnation ratio has a large volume, the heat internally developed during the polymerization of the resin composition produced small cracks in the interior of the workpiece. Furthermore, the great weight increase imposes limitations on the weight of the wood head.

The samples of Examples 3 and 4 are satisfactory in impact resistance and durability and are minimized in weight gain. The portion of the head other than the hitting side is low in resin impregnation ratio. Since the resin composition is polymerized by the irradiation of ionizing radiation and not by heating, the amount of heat developed in the interior is small to inhibit cracking due to heat generation. The wood head, which is impregnated with resin in its entirety, is highly amenable to coating and has high dimensional stability.

According to the present invention described above, the hitting side of a wood head workpiece is impregnated with a liquid resin composition at a high ratio to a suitable thickness (preferably 4 to 18 mm), the workpiece is then entirely impregnated with another liquid resin composition at a low ratio and the resin compositions are thereafter polymerized and cured, so that a resin-impregnated layer of high impregnation ratio is formed on the hitting side, permitting the hitting side to have sufficient durability against impact. Since the major portion of the head other than the hitting side is impregnated with the resin only at a low ratio, the overall amount of the impregnating resin can be smaller to minimize the increase in the weight of the head due to the impregnation.

The resin compositions to be used in this invention are not limited to those described above, but the resins heretofore used for reinforcing wood heads are of course usable.

I claim:

1. A process for producing a wood head of a golf club by impregnating a wood head workpiece with a resin to give durability to the wood head, the process comprising the steps of:

forming the workpiece so that the hitting surface thereof extends in parallel with internal channels therein, immersing the workpiece in a first liquid resin composition only at the hitting side to impregnate the hitting side with the composition at a high ratio and form a resin-impregnated layer of high impregnation ratio, impregnating the entire workpiece with a second liquid resin composition at a low ratio, and polymerizing and curing the first and second resin compositions.

2. A process as defined in claim 1 wherein the compositions are polymerized and cured by heating.

3. A process as defined in claim 1 wherein the compositions are polymerized and cured by irradiation of ionizing radiation.

4. A process as defined in claim 3 wherein the compositions are polymerized and cured by $^{60}$Co gamma irradiation at a dose rate of about $5 \times 10^4$ r/hr for about 30 to about 60 hours in a nitrogen atmosphere at room temperature and at atmospheric pressure.

5. A process as defined in claim 1 wherein the first resin composition and the second resin composition contain polyethylene glycol dimethacrylate represented by the formula

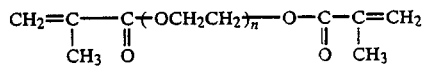

wherein n is 1 to 23, or polyethylene glycol diacrylate represented by the formula

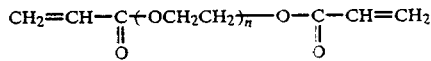

wherein n is 1 to 23.

6. A process as defined in claim 5 wherein the first resin composition and the second resin composition contain a tri- or tetra-functional monomer as a three-dimensional crosslinking agent.

7. A process as defined in claim 5 or 6 wherein each of the first resin composition and the second resin composition contains 1 to 1.5 parts by weight of a thermally decomposable radical polymerization initiator per 100 parts by weight of the composition, and the initiator completes the polymerization in the interior of the workpiece at an elevated temperature of 40° to 90° C. within 3 hours.

8. A process as defined in claim 1 wherein the portion of high impregnation ratio has an impregnation ratio of at least 30%.

9. A process as defined in claim 1 wherein the portion of low impregnation ratio has an impregnation ratio of 0.5 to 8.0%.

10. A process as defined in claim 1 wherein the portion of low impregnation ratio has an impregnation ratio of 0.5 to 5.0%.

11. A process as defined in claim 1 wherein the resin-impregnated layer of high impregnation ratio is 4 to 18 mm in thickness.

12. A resin impregnation apparatus comprising a closed case connected to a vacuum pump, at least one receptacle disposed within the case, a resin composition supply pipe disposed above the receptacle and a liquid level adjusting tube attached to the bottom of the receptacle and positioned at an adjustable level.

13. An apparatus as defined in claim 12 wherein a plurality of receptacles are disposed in layers, and each of the receptacles other than the uppermost receptacle is provided with a resin composition supply pipe which is the liquid level adjusting tube projecting from each receptacle immediately thereabove.

* * * * *